United States Patent [19]

Suzuki et al.

[11] Patent Number: 5,896,557
[45] Date of Patent: Apr. 20, 1999

[54] SET TOP TERMINAL

[75] Inventors: Kazuo Suzuki, Gifu-ken; Yoshimasa Gannyo, Hashima; Kazumasa Ozawa, Ichinomiya; Hirotoshi Takeuchi, Gifu-ken; Toao Ishida, Aichi-ken, all of Japan

[73] Assignee: Matsushita Electric Industrial Co., Ltd., Kadoma, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/506,780

[22] Filed: Jul. 26, 1995

[51] Int. Cl.⁶ ............................................. H04N 7/16
[52] U.S. Cl. ................................... 455/6.2; 348/10
[58] Field of Search ........................ 348/10, 6, 8, 11, 348/12, 839, 836; 455/3.1, 4.1, 6.2

[56] References Cited

U.S. PATENT DOCUMENTS

| | | | |
|---|---|---|---|
| 3,679,829 | 7/1972 | Hofmeister et al. | 348/836 X |
| 5,093,921 | 3/1992 | Bevins, Jr. | 455/4.1 |
| 5,353,121 | 10/1994 | Young et al. | 348/563 |
| 5,367,571 | 11/1994 | Bowen et al. | 349/10 X |
| 5,483,277 | 1/1996 | Granger | 455/3.1 |

*Primary Examiner*—Nathan Flynn
*Attorney, Agent, or Firm*—Renner, Otto, Biosselle & Sklar, P.L.L.

[57] ABSTRACT

A set top terminal of the present invention includes: a tuner unit for receiving a signal from an external input terminal and selecting a signal of a predetermined frequency; a signal processing unit for decoding the selected signal; a modulation unit for outputting a signal obtained by decoding the selected signal from an external output terminal; a control unit for controlling the tuner unit, the signal processing unit and the modulation unit; a power source unit for supplying power to the tuner unit, the signal processing unit, the modulation unit and the control unit, respectively; and a main board on which the tuner unit, the signal processing unit, the modulation unit and the control unit are placed, wherein the tuner unit, the signal processing unit, the modulation unit, the control unit and the power source unit are separate individual bodies.

32 Claims, 8 Drawing Sheets

SET TOP TERMINAL

BACKGROUND OF THE INVENTION

1. Field of the Invention

The present invention relates to a set top terminal used for a television receiver and the like.

2. Description of the Related Art

Figure 11:
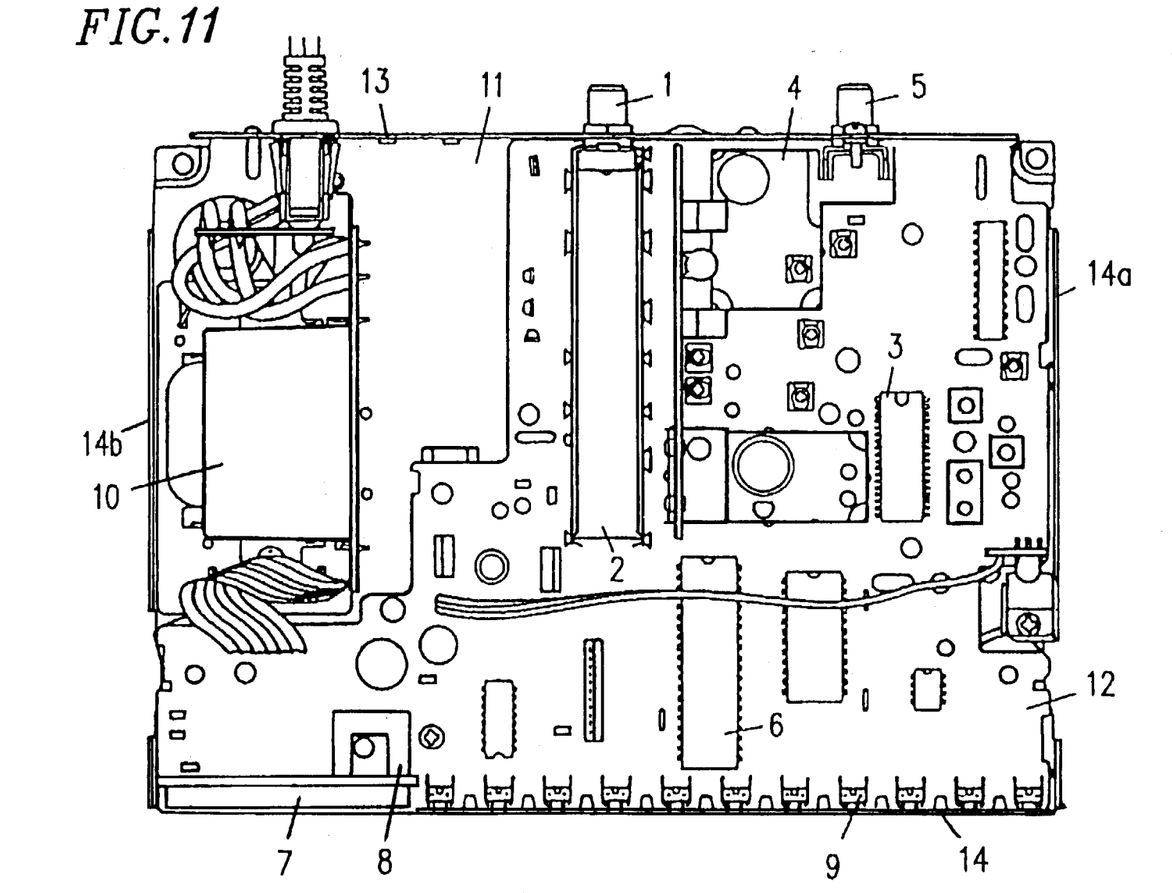
FIG. 11 is a plan view showing a layout inside a chassis of a conventional set top terminal.

A conventional set top terminal will be described with reference to FIG. 11. The conventional set top terminal includes: an input terminal 1; a tuner part 2 connected to the input terminal 1; a signal processing part 3; a modulation part 4; an output terminal 5 connected to an output of the modulation part 4; a control part 6 for controlling the entire set top terminal; a display part 7; a common part 8; and a key operation part 9.

The signal processing part 3, which consists of, for example, a video detection circuit or a descrambler, is connected to an output of the tuner part 2. The modulation part 4, which consists of an RF converter and the like, is connected to an output of the signal processing part 3. The control part 6 has a micro computer and is connected to both the tuner part 2 and the signal processing part 3. The display part 7 is constituted by light emitting diodes (hereinafter, referred to as LEDs) capable of displaying two digit or four digit numbers. The common part 8 receives a signal transmitted from a remote control transmitter (not shown). Inside a body of the set top terminal, a power source part 10 is provided.

The set top terminal is such that its body is constituted by a chassis 11 and a cover made of resin (not shown) covering the upper part of the chassis 11. A main board 12 is attached inside the chassis 11. In approximately the center of one lateral side 13 of the chassis 11, the tuner part 2, to which the input terminal 1 is fixed, is provided. Furthermore, in the vicinity of one longitudinal side 14a, the output terminal 5 is fixed on the lateral side 13.

The modulation part 4 and the signal processing part 3 are mounted onto the main board 12 in the vicinity of the output terminal 5. The control part 6 is mounted onto the main board 12 in the rear of the signal processing part 3. In the vicinity of the other lateral side 14 facing the lateral side 13, the key operation part 9 and the display part 7 consisting of LEDs are placed so as to be attached onto the main board 12. The power source part 10 is provided in the vicinity of the other longitudinal side 14b.

The set top terminal is capable of receiving channels of about one hundred cable television services. Therefore, various specifications can be selected depending on the demand of a user. In the conventional configuration, however, it is necessary to prepare the main boards corresponding to the number of specifications for satisfying these various specifications. Therefore, it is necessary to control a great number of main boards.

SUMMARY OF THE INVENTION

The set top terminal of this invention, includes: a tuner unit for receiving a signal from an external input terminal and selecting a signal of a predetermined frequency, the signal being scrambled; a signal processing unit for decoding the scrambled selected signal; a modulation unit for outputting a signal obtained by decoding the scrambled selected signal from an external output terminal; a control unit for controlling the tuner unit, the signal processing unit and the modulation unit; a power source unit for supplying power to the tuner unit, the signal processing unit, the modulation unit and the control unit, respectively; and a main board on which the tuner unit, the signal processing unit, the modulation unit and the control unit are placed; wherein the tuner unit, the signal processing unit, the modulation unit, the control unit and the power source unit are separate individual bodies.

In one embodiment of the invention, the set top terminal further includes a body, wherein the body has a bottom face of a substantially quadrangular shape and a first side, a second side, a third side, and a fourth side.

In another embodiment of the invention, the external input terminal and the external output terminal are placed on the first side, and the key operation unit for outputting information to the control unit and the display unit are placed on the fourth side, which faces the first side.

In still another embodiment of the invention, the control unit has a control board and a read/write non-volatile memory, and the main board has a plurality of terminals capable of observing a signal output from the nonvolatile memory.

In still another embodiment of the invention, the set top terminal further includes a display unit for displaying at least channels of CATV and a remote control receiving unit, wherein the remote control receiving unit and the display unit are formed on a single first board.

In still another embodiment of the invention, the remote control receiving unit has a light-receiving element for receiving a signal of an infrared ray and a supporting member for supporting the light-receiving element, the supporting member being engaged with the first board and the main board.

In still another embodiment of the invention, the modulation unit is surrounded by an electromagnetic shielding plate, except for an upper part of the modulation unit.

In still another embodiment of the invention, the entire modulation unit is surrounded by an electromagnetic shielding plate.

In still another embodiment of the invention, the modulation unit has an input terminal for receiving the signal obtained by decoding the scrambled signal and an output terminal for outputting a signal obtained by modulating the decoded scrambled signal, wherein the input terminal and the output terminal penetrate the main board, and the input terminal and the output terminal are bent toward the main board in order to obtain electrical connection with the main board.

In still another embodiment of the invention, the set top terminal further includes a heating plate, wherein part of the heating plate is in close contact with the second side, and an end of the heating plate is connected to a control board.

In still another embodiment of the invention, the set top terminal further includes a data demodulation unit for demodulating a signal output from the tuner unit and outputting the demodulated signal to the control unit; and a data modulation unit for modulating a signal output from the control unit and outputting the modulated signal to the tuner unit, wherein the data demodulation unit and the data modulation unit are placed between the tuner unit and the power source unit.

In still another embodiment of the invention, the set top terminal further includes a data modulation unit for modulating a signal output from the control unit and outputting the modulated signal to the tuner unit, the data modulation unit being positioned between the tuner unit and the power source unit.

In still another embodiment of the invention, the data demodulation unit has a substantially identical external form as that of the data modulation unit, and the data demodulation unit and the data modulation unit have projecting portions at positions off-center from a center of a side of the data demodulation unit and a side of the data modulation unit.

In still another embodiment of the invention, the external input terminal is located at an approximately center of the first side.

In still another embodiment of the invention, the external output terminal is provided on the first side substantially midway between the external input terminal and a corner formed by the first side and the third side.

In still another embodiment of the invention, the control unit has a control board, a CPU for controlling the set top terminal, and a memory.

In still another embodiment of the invention, the control unit further includes an auxiliary member for connecting the control board and the main board.

In still another embodiment of the invention, the auxiliary member electrically connects the control board and the main board.

In still another embodiment of the invention, the control unit has a plurality of L-shaped terminals, and wherein the control board and the main board are electrically connected to each other through the plurality of L-shaped terminals.

In still another embodiment of the invention, the control board has at least one projection on longitudinal edges of corners of the control board, and at least one of the projections has at least one pattern on one surface of the projection for inputting/outputting a signal to the main board.

In still another embodiment of the invention, at least one of the projections has the at least one pattern on the other surface of the projection for inputting/outputting a signal to the main board.

In still another embodiment of the invention, a plurality of L-shaped terminals are engaged with the control board and-placed between two projections.

In still another embodiment of the invention, the main board has a plurality of apertures corresponding to a plurality of L-shaped terminals with which the plurality of L-shaped terminals are engaged, the plurality of apertures are formed into a staggered form, and wherein the main board further includes openings for receiving the projections.

In still another embodiment of the invention, the memory stores a program guidance of CATV.

In still another embodiment of the invention, the memory stores communications protocol.

According to another aspect of the invention, the set top terminal includes: a tuner unit for receiving a signal from an external input terminal and selecting a signal of a predetermined frequency; a signal processing unit for receiving the selected signal and for processing the selected signal; a modulation unit for outputting the processed signal; a control unit for controlling the tuner unit and the signal processing unit; and a power source unit for supplying power to the tuner unit, the signal processing unit, the modulation unit and the control unit, respectively; wherein the tuner unit, the signal processing unit; the modulation unit, the control unit and the power source unit are constituted by a separated individual body, respectively.

In one embodiment of the invention, the set top terminal further includes a body and a main board, wherein the body has a bottom face of a substantially quadrangular shape and a first side, a second side, a third side and a fourth side.

In one embodiment of the invention, the set top terminal further includes a read/write memory, and the read/write memory is constituted by a separate individual body.

In another embodiment of the invention, the set top terminal further includes a main board attached into the body, the control unit has a control board and a read/write memory, and the main board has a plurality of terminals which receive a signal output from the read/write memory.

In still another embodiment of the invention, the read/write memory is connected to a plurality of signal lines which extend to the main board.

In still another embodiment of the invention, the read/write memory is attached to the control board, and the control board is attached to the main board.

In still another embodiment of the invention, the read/write memory is nonvolatile.

In still another embodiment of the invention, the read/write memory is attached to the main board via a socket so that the read/write memory can be removed and replaced with an alternate memory.

In still another embodiment of the invention, the set top terminal further includes a display unit for displaying at least channels of CATV and a remote control receiving unit, and the display unit is formed on a single first board.

In still another embodiment of the invention, the modulation unit has an input terminal for receiving the processing signal and an output terminal for outputting the processing signal, the input terminal and the output terminal penetrate the main board, and the input terminal and the output terminal are bent toward the main board in order to obtain electrical connection with the main board.

In still another embodiment of the invention, the modulation unit has an input terminal for receiving the signal obtained by decoding the scramble signal and an output terminal for outputting a signal obtained by modulating the decoded scramble signal, wherein a portion of the input terminal and the output terminal extend horizontally to the main board and a portion of the input terminal and output terminal is bend toward the main board.

In still another embodiment of the invention, the set top terminal further includes a heating plate, part of the heating plate is in close contact with the second side in the vicinity of an external output terminal, the part of the heating plate being parallel with the second side, and an end of the heating plate is connected to a control board.

In still another embodiment of the invention, the set top terminal further includes a data demodulation unit for demodulating a signal output from the tuner unit and outputting the demodulated signal to the control unit; a data modulation unit for modulating a signal output from the control unit and outputting the modulated signal to the tuner unit, the data demodulation unit and the data modulation unit being placed between the tuner unit and the power source unit. The data demodulation unit is parallel with the tuner unit and the power source unit. The data modulation unit is parallel with the tuner unit and the power source unit.

It is possible to attach the units required for a set top terminal to a main board in accordance with the specification of the set top terminal. For example, an optimal tuner unit can be selected from tuner units of a plurality of specifications. The maximum number of set top terminals which can be produced is a multiple of the number of specifications of each block. Moreover, since components can be managed for each unit, the components constituting the set top terminal can be easily managed.

Furthermore, the set top terminal can be independently ensured for each block unit. Thus, since the set top terminal can be exchanged for each block unit, it is possible to provide quick service for users.

Thus, the invention described herein makes possible the advantages of providing a set top terminal, which is capable of corresponding to various specifications and can be easily controlled.

These and other advantages of the present invention will become apparent to those skilled in the art upon reading and understanding the following detailed description with reference to the accompanying figures.

DESCRIPTION OF THE PREFERRED EMBODIMENTS

A set top terminal according to one embodiment of the present invention will be described by way of illustrative drawings.

Figure 1:
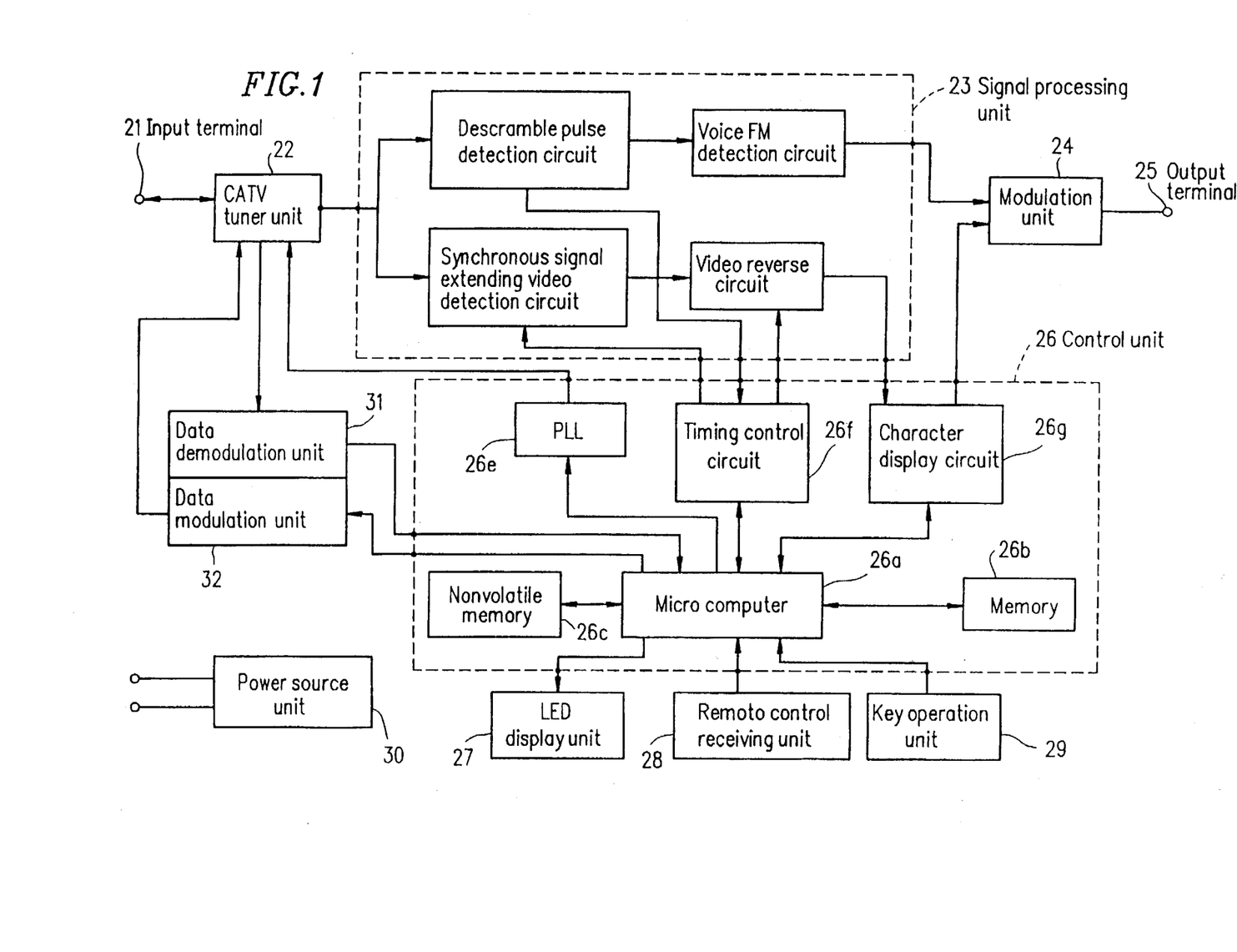
FIG. 1 is a block diagram illustrating a set top terminal according to one embodiment of the present invention.
Figure 2:
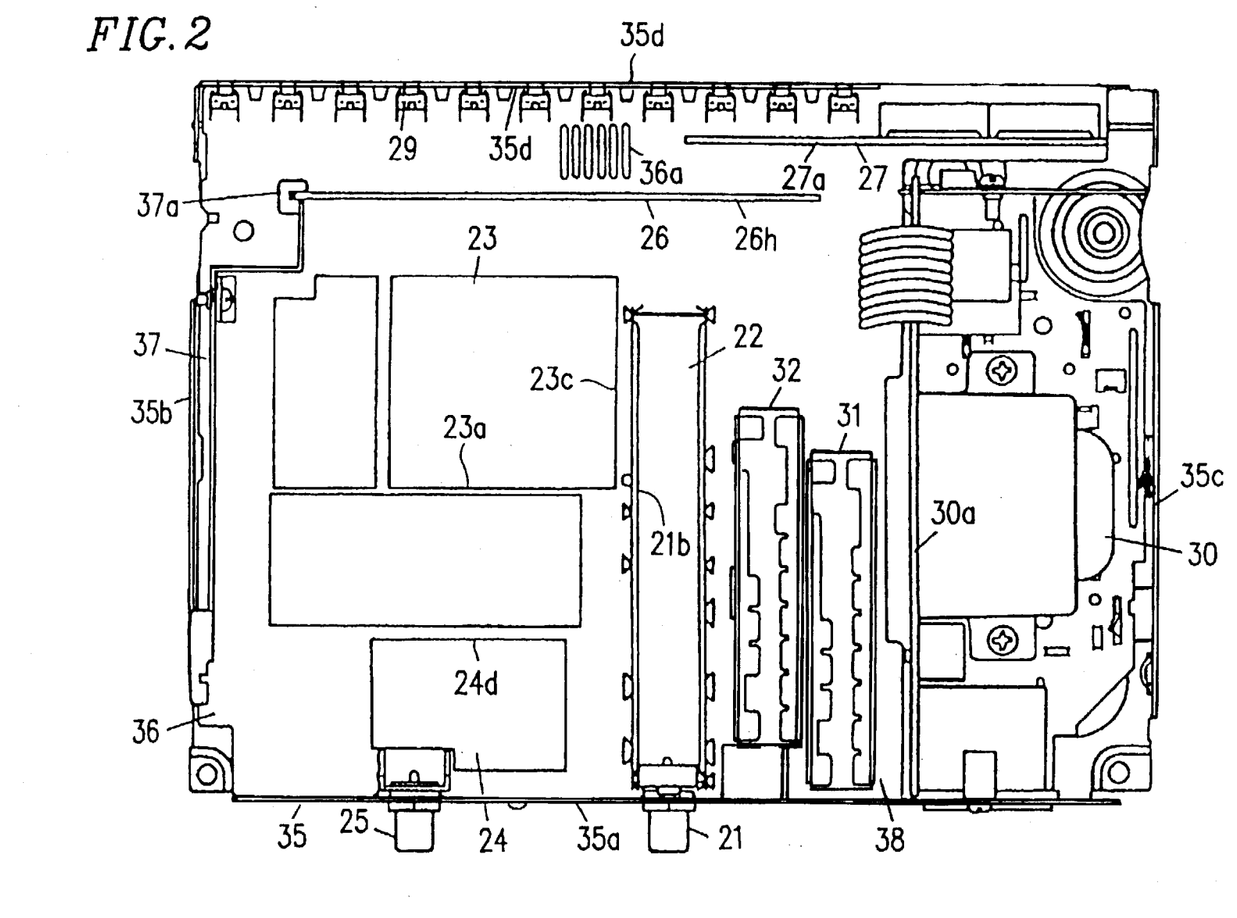
FIG. 2 is a plan view showing a layout of the set top terminal shown in FIG. 1.

FIG. 1 is a block diagram showing a set top terminal of an example according to the present invention. FIG. 2 illustrates a layout inside a chassis of the set top terminal.

As shown in FIG. 1, the set top terminal according to the present invention includes: an input terminal 21; a tuner unit 22; a signal processing unit 23; a modulation unit 24; an output terminal 25; a control unit 26; a display unit 27; a remote control receiving unit 28; a key operation unit 29; a power source unit 30; a data demodulation unit 31; and a data modulation unit 32.

The tuner unit 22 is connected to the input terminal (input/output terminal) 21. An output terminal of the tuner unit 22 is connected to the signal processing unit 23. The signal processing unit 23 has at least three output terminals, each being connected to both the modulation unit 24 and the control unit 26.

The tuner unit 22, the signal processing unit 23, the modulation unit 24, the control unit 26, the display unit 27, the remote control receiving unit 28 and the power source unit 30 are independent from each other. In other words, their units are not integrated. However, the CATV tuner unit may include the signal processing unit if desired. Each of the configurations thereof will be described below.

Hereinafter, the operations and the configurations of the tuner unit 22, the signal processing unit 23, the modulation unit 24, the control unit 26, the display unit 27 and the remote control receiving unit 28 are individually described.
Tuner unit The CATV tuner unit 22 basically selects a desired frequency from a high-frequency signal input from the input terminal 21 and converts the selected high-frequency signal into a video intermediate frequency. An input signal having a frequency in the range of 54 MHz to 550 MHz is input to the tuner unit 22 via the input terminal 21. The tuner unit 22 converts the input signal to an intermediate frequency of, for example, 45.75 MHz or 38.9 Mhz.

The tuner unit 22 may receive a signal having a frequency up to 750 MHz and select a desired frequency from the received signal so as to convert the selected high-frequency signal into a video intermediate frequency. Furthermore, the tuner unit 22 may receive a signal up to over 1 GHz.

Specifically, the tuner unit 22 may double as a supertuner or a single supertuner.

If the signal input from the input terminal 21 is a digital signal, the tuner unit 22 may be a digital tuner which is capable of receiving a digitally transmitted signal. In such a case, the tuner unit 22 may include at least one of an extraction circuit (for example, I/Q detection), an analogue-digital conversion circuit, or a digital-analogue conversion circuit. If the tuner unit 22 has neither the extraction circuit nor the analogue-digital conversion circuit, the signal processing unit 23 described below may includes the extraction circuit or the digital-analogue conversion circuit.

The tuner unit 22 mounted onto a main board is selected from tuner units of various specifications based on the conditions such as performance of the set top terminal and the area where the set top terminal is used.
Signal processing unit The signal processing unit 23 includes: a descramble pulse detection circuit for outputting a signal obtained by descrambling a scrambled signal to an original signal, or a control signal for decoding the scrambled signal to an original signal; a voice FM detection circuit for demodulating a signal subjected to FM modulation; a synchronous signal extending video detection circuit for changing a synchronous signal; and a video reverse circuit. The signal processing unit 23 is constituted by a known circuit, as shown in the block diagram.

Alternatively, the signal processing unit 23 may include a circuit for descrambling a scrambled signal to the original signal. Furthermore, the signal processing unit described above may includes a circuit for selecting a desired voice from voice-multiplexed signals; or a circuit for selecting a control signal from a video signal.

The signal processing unit 23 may have a circuit for extending data of MPEG compression or a circuit for correcting an error of the decoded signal after demodulation, in the case of digital transmission processing.

Moreover, the signal processing unit 23 mounted to the main board is selected from the signal processing units of various specifications based on the conditions such as performance of the set top terminal and the area where the set top terminal is used.
Modulation unit The modulation unit 24 converts the descrambled signal into a high-frequency signal so as to output a converted signal. A modulation unit for outputting a VHF signal having a frequency of, for example, 61.25 MHz or a modulation unit for outputting a UHF signal having a frequency of, for example, 743.25 MHz is selected as the modulation unit 24 depending on the environment where the set top terminal is used.

An output channel of a signal outputted from the signal processing unit 23 is switched based on the command of the signal processing unit 23.

The modulation unit 24 is selected from modulation units of various specifications based on the specification of the set top terminal.

Display unit

The display unit 27 performs display of a received channel, current time a nd volume based on the command of the control unit 26. A display unit constituted by LEDs for displaying 2 digit numbers or a display unit constituted by LEDs for displaying 4 digit numbers is selected depending on the specification of the set top terminal.

The display unit 27 may include a display device which is capable of displaying the alphabet and/or the number. The display unit. 27 is selected based on the specifications of the set top terminal.

Remote control receiving unit

The remote control receiving unit 28 receives a command from a remote control transmitter (not shown) so as to deliver the command to the control unit 26. The channel of the CATV can be selected by using the remote control transmitter instead of using the key operation unit 29 described below. The selection of the remote control receiving unit 28 may be omitted depending on the specification of the set top terminal.

Key operation unit

The key operation unit 29 is used in the case where the set top terminal is externally controlled. For example, the key operation unit 29 is used in the case where a channel of the CATV is selected.

Data demodulation unit and data modulation unit

The data demodulation unit 31 demodulates a signal from an operator of the CATV (not shown) into data which can be handled by the control unit 26. The data modulation unit 32 modulates a signal from the control unit 26 so as to transmit the signal of the set top terminal to the operator.

The data demodulation unit 31 and/or the data modulation unit 32 are selected based on the specification of the set top terminal.

Control unit

The control unit 26 includes: a micro computer 26a; a memory 26b; a read/write nonvolatile memory 26c; a PLL circuit 26e; a timing control circuit 26f; and a character display circuit 26g.

The control unit 26 controls selection of the channel of the CATV, contract information, descramble, accounting information and an electric program guide.

A signal for selecting a channel of the CATV is input to the micro computer 26a from the remote control unit 28 or the key operation unit 29. A signal for selecting the channel of the CATV is input to the CATV tuner unit via the PLL 26e. By this operation, the channel of the CATV is selected.

The contract information is input to the micro computer 26a via the CATV tuner unit and the data demodulation unit. The contract information is used for identifying whether a user is a subscriber of a standard program or a subscriber of an optional program (demanded program).

Next, decoding of a scrambled signal will be described. The micro computer 26a receives a signal which decodes a scrambled signal from a descramble pulse detection circuit via the timing control circuit 26f. The micro computer 26a determines whether the scrambled TV program should be decoded or not based on the contract information and the channel of the CATV to be selected. In the case where the scrambled signal is decoded, the micro computer 26a commands the decoding of the scrambled signal to the timing control circuit 26f. The timing control circuit 26f outputs a descramble pulse to the synchronous signal extending video detection circuit and the video reverse circuit. This operation makes it possible to decode the scrambled signal.

If a subscriber selects a charged optional program (demanded program) and therefore should pay an optional fee for the selected charged program, the micro computer 26a may transmit the accounting information via the data modulation circuit of the subscriber who should pay the optional fee to a provider of TV service.

The set top terminals of a certain specification include an electric program guide function showing the CATV programs broadcast in the CATV. The CATV program transferred by the provider is stored in the memory 26b and/or the read/write nonvolatile memory 26c via the data demodulation circuit and the micro computer.

The relationship between the electric program guidance and the memory 26b and/or the read/write nonvolatile memory 26c is shown in Table below.

TABLE

| Type | Memory | | Use | Memory Cost |
| | DRAM | FLASH memory | | |
| --- | --- | --- | --- | --- |
| Type I | None | None | Without a guidance for TV programs | 0 |
| Type II | About 1 Mbit | About 128 kbyte | With a guidance for TV programs for a day | About 9 dollars |
| Type III | About 4 Mbit | About 256 kbyte | With a guidance for TV programs for a week | About 20 dollars |
| Type IV | more than 4 Mbit | more than 256 kbyte | Receiving a communications protocol for connection with a different video server and/or with a guidance for TV programs for a week | more than 20 dollars |

As shown in the above Table, when the memory 26b and/or the read/write nonvolatile memory 26c have/has a large capacity, an electric program can be stored therein for a long period of time.

Moreover, as shown in the above Table, when the memory 26b and/or the nonvolatile memory 26c capable of reading and writing are/is sufficiently large, the set top terminal can provide the services described below.

For example, the memory 26b and/or the nonvolatile memory 26c may store the program as an additional service of the CATV supply. These memories may be used for download of a communication software (OS or protocol) which facilitates interconnection with home shopping, game distribution or new services. Specifically, if a subscriber wants to receive a provided service from video servers consisting of a plurality of contents, a communication protocol corresponding to the plurality of video servers is required. In this case, only a starter software of the minimum size for communicating with a plurality of video servers is previously stored in the memory 26b and/or the nonvolatile memory 26c. The micro computer downloads the communication protocol from an intended video server based on the starter software. The downloaded communication protocol is stored in a writable memory (for example, the nonvolatile memory 26c and/or memory 26b). It is preferable that a flash memory having a short write time be used as a writable memory, for example, the nonvolatile memory 26c and/or the memory 26b. However, a DRAM, which has a lower writing speed of data, a larger memory, and is lower in cost than the flash memory may also be used as a writable memory in view of trade-off between the writing time and the cost of memory. The flash memory can hold the stored data without being externally supplied with power.

Moreover, the nonvolatile memory 26c may store ID (identity) for CATV distribution and additional information of the ID (identity). In the case where it is not particularly necessary to rewrite the data stored in the memory, the memory may be a ROM.

As shown in the above Table, the cost of the control unit greatly varies depending on the capacity of the memory. In the case where the structure of the control unit other than the memory can be used with a control unit of another specification, the memory can be constituted as a detachable independent body. The user can select a desired set top terminal from set top terminals corresponding to various control units (for example, type I to type IV), taking the cost and the functions of the set top terminal into consideration. Similarly, in the case where the other components of the control unit may be common and the like, only the memory 26b and/or the nonvolatile memory 26c may be an independent body.

Power source unit

The power source unit 30 supplies a power source to the tuner unit 22, the signal processing unit 23, the modulation unit 24, the control unit 26, the LED display unit 27, the remote control receiving unit 28, the key operation unit 29, the data demodulation unit 31 and the data modulation unit 32, respectively.

The voltage input to the power source unit 30 varies depending on the area where the set top terminal is used. Specifically, a voltage such as 100 V, 115 V, 220 V, 230 V or 240 V is input to the power source unit 30. Therefore, the power source unit 30 has a different specification depending on the voltage input to the power source unit 30.

Hereinafter, the layout of a set top terminal of one embodiment of the present invention will be described.

Figure 3:
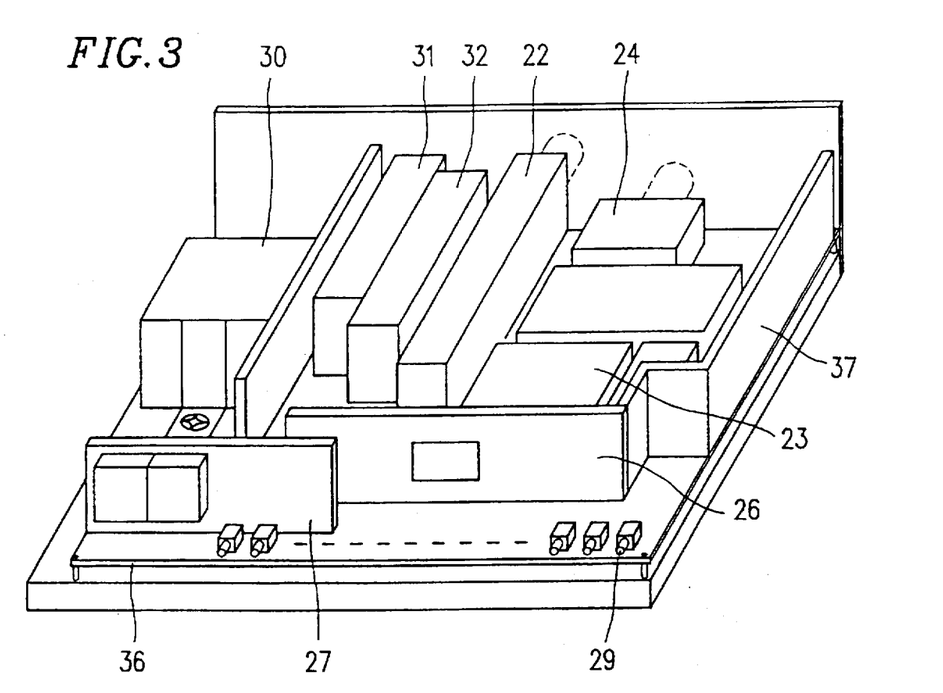
FIG. 3 is a perspective view showing a layout of the set top terminal shown in FIG. 1.

FIG. 2 is a view showing a set top terminal viewed from above, and FIG. 3 is a perspective view of the set top terminal shown in FIG. 2.

On a main board 36, the tuner unit 22, the signal processing unit 23, the modulation unit 24, the control unit 26, the display unit 27, the data demodulation unit 31 and the data modulation unit 32 are mounted. Each of the units is produced and managed as an individual device. Each unit is selected from various units of each kind in accordance with the specification of the set top terminal, and is attached to the main board 36.

The main board 36 and the power source unit 30 are surrounded by a metal chassis 35 having a substantially quadrangle shape. The metal chassis 35 has a first side 35a, a second side 35b, a third side 35c and a fourth side 35d. The first side 35a faces and is substantially parallel with the fourth side 35d, and the second side 35b faces and is substantially parallel with the third side 35c.

A cover made of resin (not shown) covers the upper part of the metal chassis 35 and is fit to the metal chassis 35. The cover is fixed to the metal chassis 35 with vises. The above-mentioned input terminal 21 is provided at approximately the center of the first side 35a. The input terminal 21 is fixed to the tuner unit 22. An output terminal 25 is provided on the first side 35a approximately midway between the input terminal 21 and the corner formed by the first side 35a and the second side 35b. The output terminal 25 is fixed to the modulation unit 24.

Side 24d of the modulation unit 24 faces side 23a of the signal processing unit 23. Furthermore, side 23c of the signal processing unit 23 faces side 21b of the tuner unit 22. The tuner unit 22 is adjacent to both the signal processing unit 23 and the modulation unit 24. Since the signal processing unit 23 is located in the vicinity of the tuner unit 22 and the modulation unit 24, the units 22, 23 and 24 can be connected to each other with short wirings as compared with the case where each distance between the units is longer. As a result, it is possible to prevent noise from entering the wirings.

The power source unit 30, which is provided in the vicinity of the third side 35c, is substantially parallel to the first side 35a and the second side 35b. Furthermore, a plate 30a is provided for a main board 36 side and is located in close vicinity to the bottom face of the chassis 35 and the inner face of the cover. As a result, the heat generated from the power source unit 30 does not flow toward the main board 36 so that the plate 30a cuts off the heat. The heat generated from the power source unit 30 is easily released outside the metal chassis 35 via the third side 35c and/or the bottom of the metal chassis 35. In particular, it is preferred that the third side 35c is made of a material of good thermal conductivity as compared with the material of the other sides 35a, 35b and 35d. Moreover, it is preferred that the plate 30a is made of a material of poor thermal conductivity as compared with the material of the other sides 35a, 35b and 35d.

The display unit 27 is provided in the vicinity of the fourth side 35d between the fourth side 35d and the power source unit 30. The display unit 27 may be provided on the fourth side 35d (not shown). The key operation unit 29 may be provided on the fourth side 35d. The control unit 26 is provided between the key operation unit 29 and the signal processing unit 23 at the position nearer to the signal processing unit 23. The control unit 26 is substantially parallel to the fourth side 35d. Since the control unit 26 is provided so as to be in close vicinity to the signal processing unit 23 and the key operation unit 29, the wirings between the control unit 26, the signal processing unit 23, and the key operation unit 29 can be respectively shortened. Thus, noise hardly enters the wirings.

The signal output from the nonvolatile memory 26c provided on a control board 26h is led to a plurality of jumper lead wires 36a which are parallel to each other. The plurality of jumper lead wires are provided in close vicinity to the control board 26h. Therefore, a circuit tester can be electrically connected to the jumper lead wires 36a from the upper part of the main board. As a result, the nonvolatile memory 26c can be tested with ease.

Lands of the wiring pattern of the main board or metal pins may be used instead of the jumper lead wires.

Figure 4:
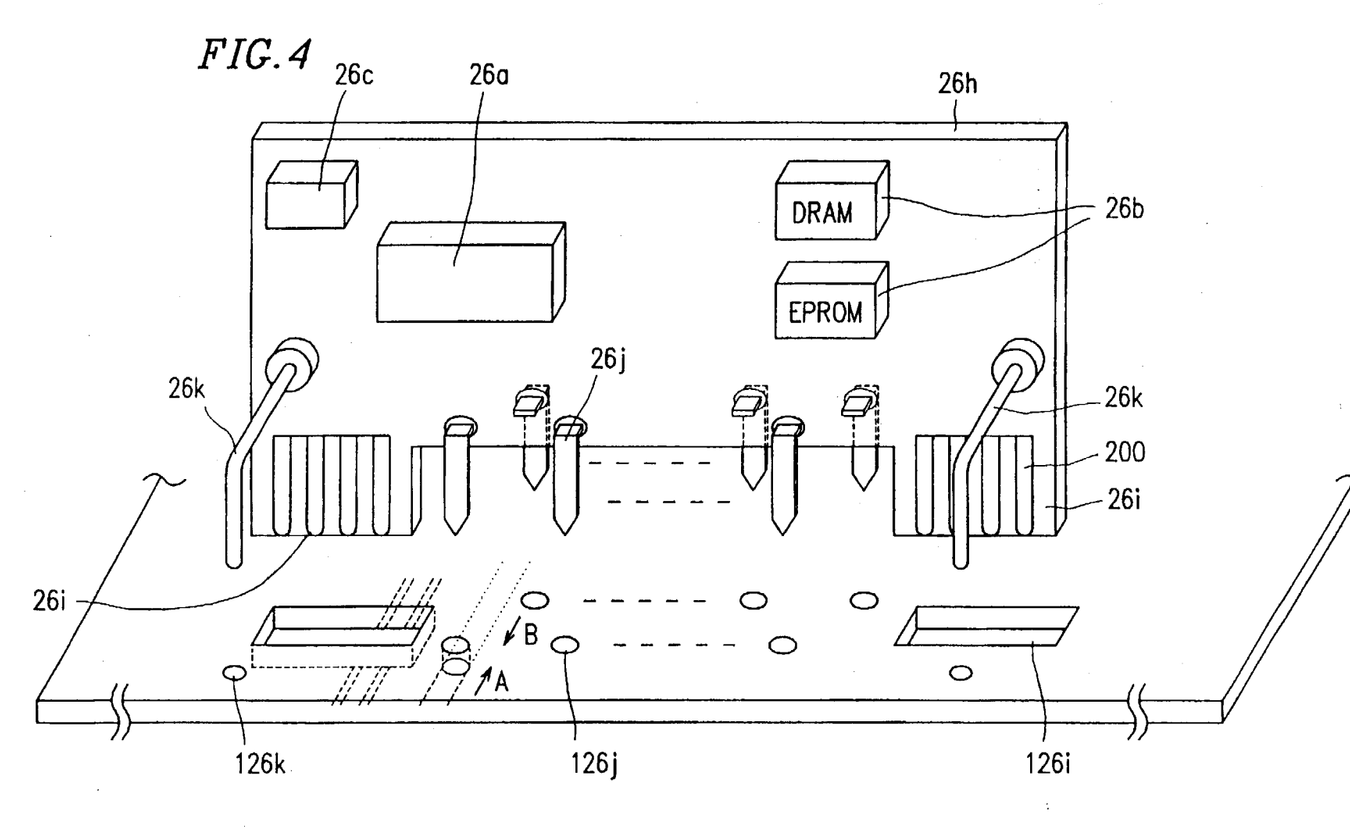
FIG. 4 is a perspective view showing a layout of a control unit.

An example of the control unit 26 will be described hereinafter. FIG. 4 shows an example of the control unit 26.

Onto the control board 26h, a micro computer 26a, a memory 26b (DRAM and a flash memory), the nonvolatile memory 26c, a PLL circuit 26e (not shown), a timing control circuit 26f (not shown) and a character display circuit 26g (not shown) are attached. The control board 26h has projections 26i respectively engaged with openings 126i of the main board 36. Wiring patterns 200 are formed on the projections 26i of the control board 26h (the wiring patterns formed on the control board are no t shown). Therefore, when the projections 26i are engaged with the openings 126i of the main board 36, the control board 26h and the main board 36 are electrically connected to each other.

L-shaped metal terminals 26j are pushed and/or inserted into the control board 26h. Thereafter, the L-shaped metal terminals 26j may be electrically connected to the main board through solder. Apertures 126j, into which the L-shaped metal terminals 26j are to be pushed and/or inserted are formed in a staggered form. The L-shaped metal terminals 26j are engaged with the apertures 126j of the main board 36, thereby firmly connecting in the control board 26h and the main board 36. The control board 26h and the main board 36 may be electrically connected to each other by engaging the metal terminals 26j with the apertures 126j of the main board 36. By boring the apertures through the main board 36, it becomes possible to draw the pattern of the main board 36 from a direction A or B. As a result, the degree of freedom of the pattern design of the main board 36 increases as compared with that in the case where the connection is achieved using the projections 26i. However, greater effect can be obtained in the case where the L-shaped metal terminals 26j are provided in the center of the control board 26h as shown in FIG. 4 than in the case where the L-shaped metal terminals 26j are provided on the end of the control board 26h. Needless to say, the fabrication cost of the control unit can be reduced if the projections 26i are used instead of using the metal terminals 26j.

Furthermore, L-shaped auxiliary members 26k may be provided on both ends of the control board 26h in order to strengthen the connection between the control board 26h and the main board ^H^H6. The control board 26h has higher anti-vibration strength as compared with that of the control board 26h without the auxiliary members 26k. Since the control board 26h and the main board 36 are electrically connected to each other, the auxiliary members 26k may be made of an electrically conductive member.

The main board may be connected to the wiring patterns 200 of the projections 26i, the metal terminals 26j and/or the auxiliary members 26k through solder.

Generally, the wiring patterns 200 of the projections 26i, the metal terminals 26j and the auxiliary members 26k have 82 pins in total. In a simplified set top terminal without the memory 26b, the wiring patterns 200 of the projections 26i, the metal terminals 26j and the auxiliary members 26k may have less than 82 pins in total. In such a case, the wiring patterns 200 of the projections 26i may be provided on one face of the board. Furthermore, in the case where the pattern is formed on only one surface of the control board 26h, the fabrication cost of the control unit can be decreased.

In the case where the memory 26b has a large capacity, it is preferred that the control board 26h is a multi-layered board.

In the control unit 26 shown in FIG. 4, a member such as the micro computer 26a is provided for the control board 26h. The control unit 26 may be configured so that the micro computer 26a and the like are provided on the main board 36 and the memory 26b alone can be inserted to the control board 26h.

Moreover, the memory 26b may be provided on the main board 36 and/or the control board 26h through a socket. In such a specification, it is possible to easily add and/or change a memory to the set top terminal after the set top terminal is shipped to the market.

The control board 26h and the main board 36 may be connected to each other through a wire harness (not shown). The wire is preferably a ribbon line. The wire harness may be connected to the control unit 26 and/or the main board 36 through solder. The above-mentioned control board and the main board may be produced by the method described below. A single board including the control board and the main board is prepared in advance. The control board and the main board are connected to each other through the portions where the apertures are bored in a broken line or a dotted line. After all elements to be mounted are mounted to the control board and the main board, the single board is soldered. Thereafter, the single board is separated into the control board and the main board through the portion where the apertures are bored.

The wire harness may be connected to the control unit 26 and/or the main board 36 through a connector, which is previously provided for the control unit 26 and/or the main board 36.

Since the control unit 26 is connected to the main board 36 through the wire harness, it is not necessary to vertically fix the control unit 26 onto the main board 36 as shown in FIG. 4. Therefore, it is possible to make the set top terminal thinner.

Figure 5:
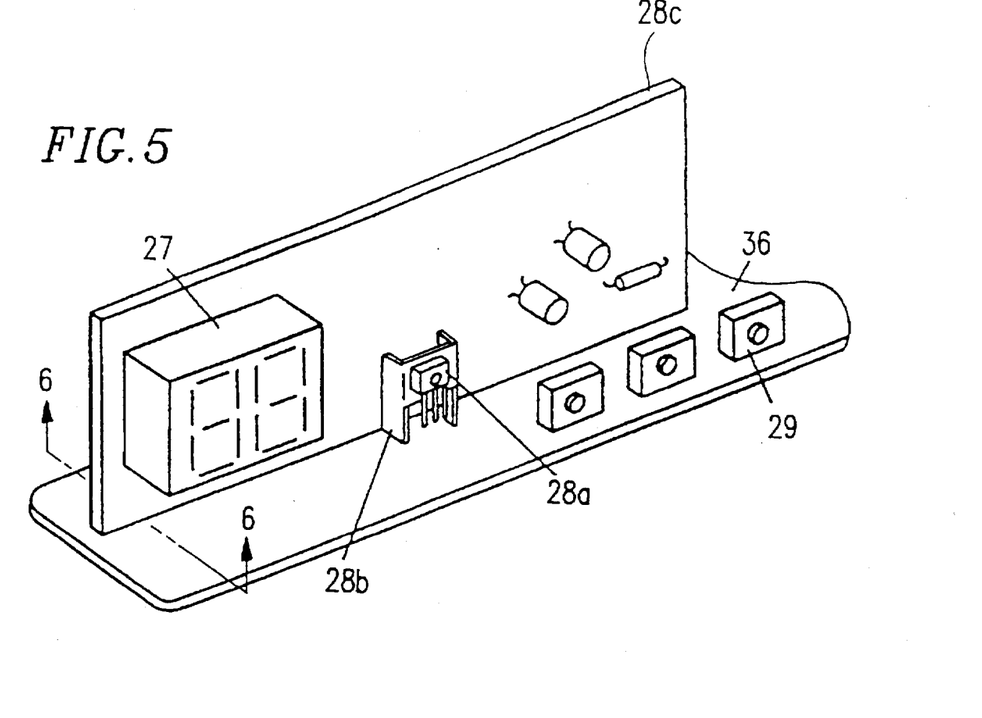
FIG. 5 is a perspective view showing a layout of a remote control receiving unit.
Figure 6:
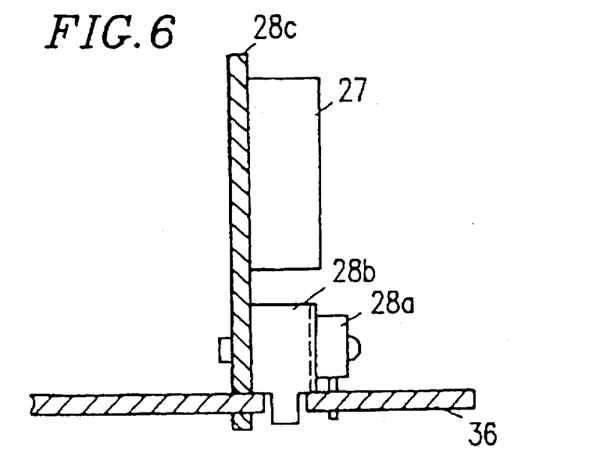
FIG. 6 is a cross-sectional view showing the remote control receiving unit taken along line 6–6' in FIG. 5.

An example of the remote control unit 28 will be described below. FIG. 5 shows an example of the remote control unit 28. FIG. 6 is a cross-sectional view of the remote control unit 28 shown in FIG. 5, taken along line 6—6.

The common board 28c includes a light-receiving element 28a for receiving a signal transmitted from the remote control transmission unit (not shown), and a supporting member 28b for supporting the light-receiving element 28a and the like. The supporting member 28b is fixed to both the common board 28c and the main board 36. As a result, the bond strength between the common board 28c and the main board 36 is increased. In the case where the display unit 27 is provided for the common board 28c, it is possible to maintain the display faces of the LEDs of the display unit 27 approximately perpendicular to the main board 36.

The remote control receiving unit 28c may have projections having wiring patterns, metal terminals, and/or auxiliary members similar to the control unit 26.

Figure 7:
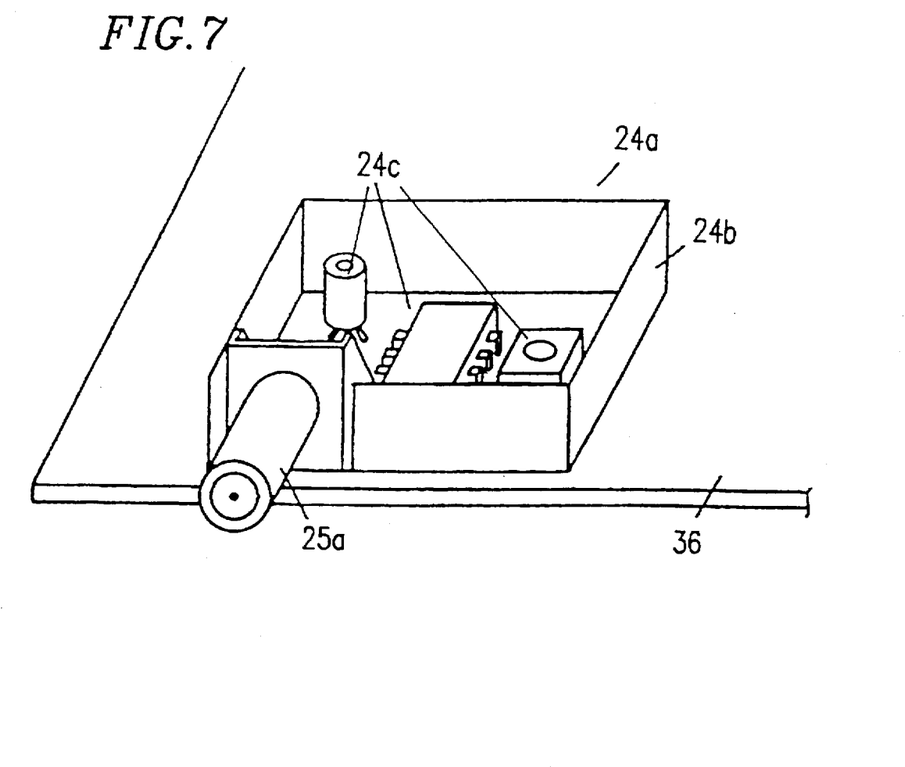
FIG. 7 is a perspective view of a first modulation unit.

An example of the modulation unit 24 will be described below. FIG. 7 is a perspective view of a first modulation unit 24a selectively attached to the main board 36. The first modulation unit 24a includes mounted components 24c surrounded by a shielding plate 24b made of metal. Since the upper side of the modulation unit 24a is open, the mounted components 24c can be easily adjusted.

Figure 8:
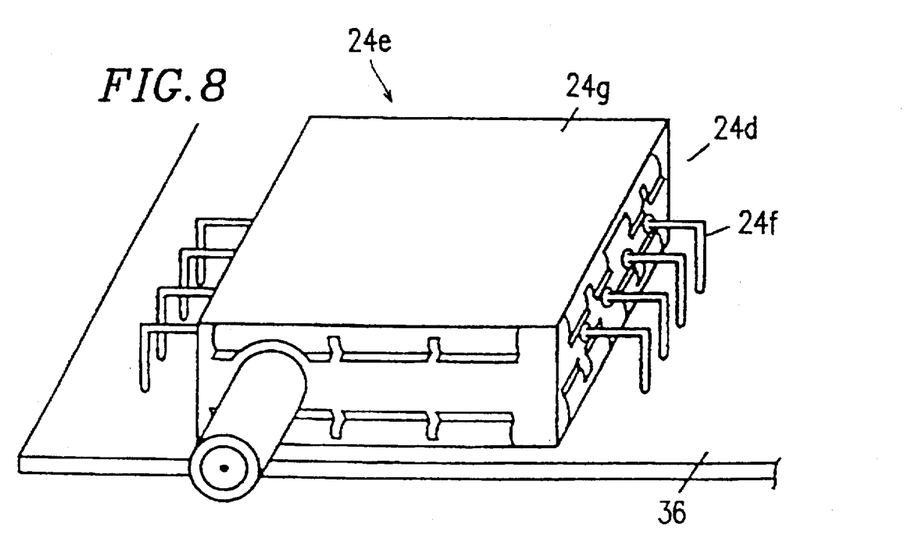
FIG. 8 is a perspective view of a second modulation unit.

FIG. 8 is a perspective view of a second modulation unit 24e selectively attached to the main board 36.

The second modulation unit 24e is surrounded by a shielding plate 24d made of metal. The second modulation unit 24e is covered with an upper lid 24g. The second modulation unit 24a is electrically connected to the main board 36 via the input terminal 24f. Therefore, it is possible to easily observe a signal output from the second modulation unit 24e although the second modulation unit has the upper lid 24g. The input terminal 24f extends to a certain length horizontally to the main board, and is bent toward the main board 36. The second modulation unit 24e and the main board 36 are not electrically connected to each other on the bottom face of the main board 36 corresponding to the modulation unit 24e, thereby increasing the degree of freedom for drawing the pattern wiring on the portion of the main board 36 corresponding to the modulation unit 24e.

As shown in FIG. 2, a heating element (for example, a power device such as a regulator IC, or a micro computer) is attached to a heating plate 37. The heat generated by the heating element is released through the heating plate 37. Part of the heating plate 37 is parallel to the second side 35b. The heating plate 37 is bent twice, and one end of the heating plate 37 is connected to the control board 26h. Therefore, since the area in contact with outside air is increased, the heat radiation effects is also increased. Furthermore, this configuration has an advantageous effect that anti-vibration strength of the control board 26h is increased. Since the heating plate 37 and the control board 26h are connected to each other in a substantially perpendicular manner, the bond strength between the heating plate 37 and the control board 26h is increased. The heating plate 37 is made of metal such as iron or aluminum. The heating plate 37 may be any member as long as it is a highly conductive member.

Figure 9:
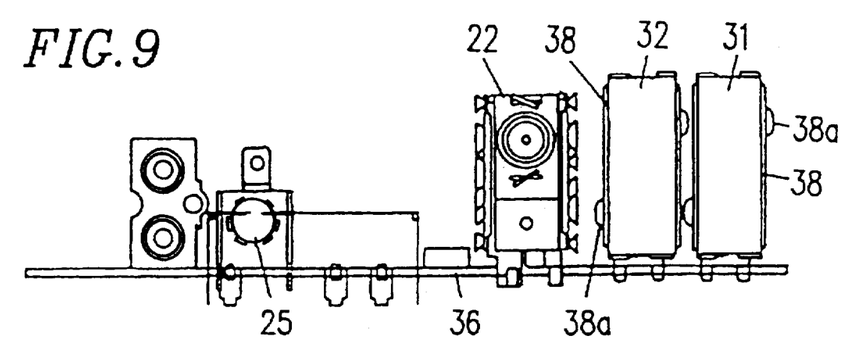
FIG. 9 is a front view showing the vicinity of a data demodulation unit and a data modulation unit.
Figure 10:
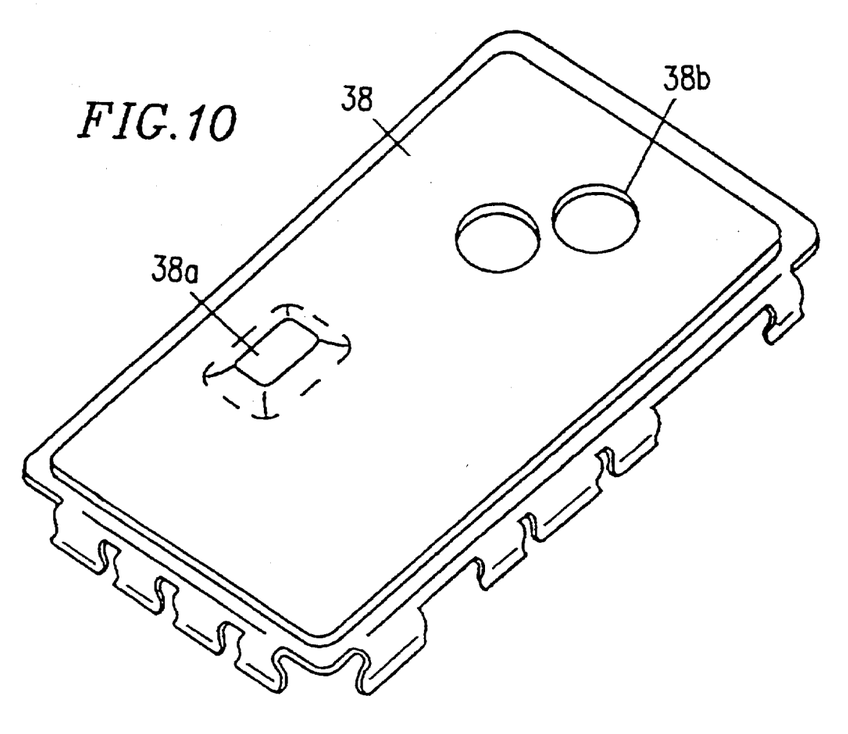
FIG. 10 is a perspective view showing a lid of a data demodulation unit and a data modulation unit.

FIG. 9 shows the arrangement of the tuner unit 22, the data demodulation unit 31 and the data modulation unit 32. The data demodulation unit 31 and the data modulation unit 32 are placed between the tuner unit 22 and the power source unit 30 (not shown in FIG. 7). The data demodulation unit 31 and the data modulation unit 32 have substantially the same shape and size. Therefore, the data demodulation unit 31 and the data modulation unit 32 can share the lid 38 (shown in FIG. 10). As shown in FIG. 10, the lid 38 has a convex portion 38a at a position which is off center. The convex portion 38a is provided in order to mount components in each part, which are large in height. Since the lid 38 has the convex portion 38a at the position which is off center, the components can be placed so as to be adjacent to each other. Apertures 38b are used for adjusting the respective components.

As shown in FIG. 9, the tuner unit 22, the data demodulation unit 31 and the data modulation unit 32 each have at least one input terminal and at least one output terminal. The at least one input terminal and the at least one output terminal, penetrate the main board 36, and are bent toward the main board in order to obtain electrical connection with the main board 36.

In the example described above, the units constituting the set top terminal are classified, for example, as follows: the tuner unit 22; the signal processing unit 23; the modulation unit 24; the control unit 26; the display unit 27; the remote control receiving unit 28; the key operation unit 29; the data demodulation unit 31; and the data modulation unit 32. However, the classification of the units constituting the set top terminal according to the present invention is not limited to the above.

For example, the units constituting the set top terminal may be classified into an analogue signal processing unit, a digital signal processing unit and a high-frequency signal processing unit and the like.

In such a case, for example, a signal processing part and a modulation part which perform analogue signal processing are configured on the main board. Furthermore, the control unit which mainly performs digital signal processing is formed on the control board as described above, and the tuner unit performing the high-frequency signal processing is accommodated within a case made of metal. The control unit and the tuner unit accommodated within the metal case are mounted onto the main board, on which the analogue signal processing unit has been already mounted. In this way, since the digital signal unit and the high-frequency signal processing unit can be configured as different units or on different boards, respectively, it is possible to reduce interference of signals between the analogue signal processing unit, the digital signal processing unit and the high-frequency signal processing unit. As a result, the performance of the set top terminal is improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A set top terminal comprising:
   a tuner unit for receiving a signal from an external input terminal and selecting a signal of a predetermined frequency;
   a signal processing unit for receiving the selected signal from the tuner and for processing the selected signal, which is located in the vicinity of the tuner unit;
   a modulation unit for outputting the processed signal to an external output terminal;
   a control unit for controlling the tuner unit and the signal processing unit;
   a power source unit for supplying power to the tuner unit, the signal processing unit, the modulation unit and the control unit, respectively;
   a display unit for displaying an information;
   a remote control receiving unit for receiving a command from a remote control transmitter; and
   a body comprising a bottom face, a first side, a second side, a third side and a fourth side;
   wherein the external input terminal and the external output terminal are placed on the first side;
   the display unit and the remote control receiving unit are placed on the fourth side facing the first side;
   the power source unit is provided in the vicinity of one of the second and the third side; and
   the tuner unit, the signal processing unit, the modulation unit, the control unit and the power source unit are separate individual bodies.

2. A set top terminal according to claim 1, further comprising a main board, wherein the body has the bottom face of a substantially quadrangular shape.

3. A set top terminal according to claim 2, wherein the key operation unit for outputting information to the control unit is placed on the fourth side facing the first side.

4. A set top terminal according to claim 1, further comprising a read/write memory, wherein the read/write memory is a separate individual body.

5. A set top terminal according to claim 2, further comprising a main board attached into the body,
   wherein the control unit has a control board and a read/write memory, and the main board has a plurality of terminals which receive a signal output from the read/write memory.

6. A set top terminal according to claim 5, wherein the read/write memory is connected to a plurality of signal lines which extend to the main board.

7. A set top terminal according to claim 5, wherein the read/write memory is attached to the control board, and the control board is attached to the main board.

8. A set top terminal according to claim 4, wherein the read/write memory is nonvolatile.

9. A set top terminal according to claim 4, wherein the read/write memory is attached to one of the main board and a control board via a socket so that the read/write memory can be removed and replaced with an alternate memory.

10. A set top terminal according to claim 1, further comprising a display unit for displaying at least channels of CATV, wherein the display unit is formed on a single first board.

11. A set top terminal according to claim 10, wherein the remote control receiving unit includes a light-receiving element for receiving a signal of an infrared ray, and a supporting member for supporting the light-receiving element, the supporting member being engaged with the first board and a main board.

12. A set top terminal according to claim 1, wherein the modulation unit is surrounded by an electromagnetic shielding plate, except for an upper part of the modulation unit.

13. A set top terminal according to claim 1, wherein the modulation unit is surrounded by an electromagnetic shielding plate.

14. A set top terminal according to claim 1, wherein the modulation unit has an input terminal for receiving a processing signal and an output terminal for outputting a signal obtained by modulating the processing signal, and wherein the input terminal and the output terminal penetrate the main board, and the input terminal and the output terminal are bent toward the main board in order to obtain electrical connection with the main board.

15. A set top terminal according to claim 1, wherein the modulation unit has an input terminal for receiving a processing signal and an output terminal for outputting a signal obtained by modulating the processing signal, and wherein a portion of the input terminal and the output terminal extend horizontally to the main board and a portion of the input terminal and output terminal is bent toward the main board.

16. A set top terminal according to claim 7, further comprising a heating plate, wherein part of the heating plate is in close contact with the second side in the vicinity of an external output terminal, the part of the heating plate being parallel with the second side, and wherein an end of the heating plate is connected to a control board.

17. A set top terminal according to claim 2, wherein the body includes a top cover, and wherein a plate is in close contact with the top cover and the bottom face, the plate provided to one side of the main board.

18. A set top terminal according to claim 1, further comprising a data demodulation unit for demodulating a signal output from the tuner unit and outputting the demodulated signal to the control unit and a data modulation unit for modulating a signal output from the control unit and outputting the modulated signal to the tuner unit, wherein the data demodulation unit and the data modulation unit are placed between the tuner unit and the power source unit.

19. A set top terminal according to claim 1, further comprising a data modulation unit for modulating a signal output from the control unit and outputting the modulated signal to the tuner unit;

the data modulation unit being positioned between the tuner unit and the power source unit.

20. A set top terminal according to claim 18, wherein the data demodulation unit has a substantially identical external form to that of the data modulation unit, and the data demodulation unit and the data modulation unit have projecting portions at positions off-center of a side of the data demodulation unit and a side of the data modulation unit.

21. A set top terminal according to claim 2, wherein the external input terminal is located at approximately a center of the first side.

22. A set top terminal according to claim 21, wherein the external output terminal is provided on the first side at approximately midpoint between the external input terminal and a corner formed by the first side and one of the second side and the third side.

23. A set top terminal according to claim 2, wherein the control unit has a control board, a CPU for controlling the set top terminal, and a memory.

24. A set top terminal according to claim 23, wherein the control unit further includes an auxiliary member for connecting the control board and the main board.

25. A set top terminal according to claim 24, wherein the auxiliary member electrically connects the control board and the main board.

26. A set top terminal according to claim 23, wherein the control unit has a plurality of L-shaped terminals, and wherein the control board and the main board are electrically connected to each other through the plurality of L-shaped terminals.

27. A set top terminal according to claim 23, wherein the control board has at least one projection on longitudinal edges of the control board, the at least one projection having first and second surfaces, and the at least one projection having at least one pattern on the first surface of the projection for inputting/outputting a signal to the main board.

28. A set top terminal according to claim 27, wherein the at least one projection has the at least one pattern on the second surface of the projection for inputting/outputting a signal to the main board.

29. A set top terminal according to claim 27, wherein a plurality of L-shaped terminals are engaged with the control board and placed between a pair of projections.

30. A set top terminal according to claim 27, wherein the main board has a plurality of apertures corresponding to a plurality of L-shaped terminals with which the plurality of L-shaped terminals are engaged, the plurality of apertures being formed in a staggered form, and wherein the main board further includes a pair of openings for receiving the projections.

31. A set top terminal according to claim 4, wherein the memory stores a program guidance.

32. A set top terminal according to claim 4, wherein the memory stores communications protocol.

* * * * *